(12) United States Patent
Cahill et al.

(10) Patent No.: US 10,259,571 B2
(45) Date of Patent: Apr. 16, 2019

(54) ELECTRICALLY CONTROLLED PARK AND EMERGENCY VALVE ASSEMBLY (71) Applicant: GOODRICH CORPORATION, Charlotte, NC (US)

(72) Inventors: Eric Daniel Cahill, Troy, OH (US); Paul R. Burte, Clayton, OH (US); Casey Canan, Bradford, OH (US); Efrem E. Ayichew, Troy, OH (US); David B. Stein, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 183 days.

(21) Appl. No.: 15/388,420

(22) Filed: Dec. 22, 2016

(65) Prior Publication Data
US 2018/0155014 A1 Jun. 7, 2018

Related U.S. Application Data (60) Provisional application No. 62/430,476, filed on Dec. 6, 2016.

(51) Int. Cl.
B64C 25/44 (2006.01)
B60T 8/17 (2006.01)
B60T 15/02 (2006.01)
B64C 25/42 (2006.01)
B64C 25/46 (2006.01)

(52) U.S. Cl.
CPC ............ B64C 25/44 (2013.01); B60T 8/1703 (2013.01); B60T 15/028 (2013.01); B64C 25/42 (2013.01); B64C 25/46 (2013.01)

(58) Field of Classification Search
CPC ....... B64C 25/44; B60T 8/1703; B60T 15/028
See application file for complete search history.

(56) References Cited

U.S. PATENT DOCUMENTS

| 5,024,491 A * | 6/1991 | Pease, Jr. ................. | B60T 7/12 303/126 |
| 5,050,940 A * | 9/1991 | Bedford ................ | B60T 8/1703 188/181 C |
| 6,193,326 B1 | 2/2001 | Ybert | |
| 6,513,885 B1 * | 2/2003 | Salamat ................ | B60T 8/1703 303/122.09 |

(Continued)

FOREIGN PATENT DOCUMENTS

WO 2012051099 4/2012

OTHER PUBLICATIONS

European Patent Office, European Search Report dated May 3, 2018 in Application No. 17205749.9-1010.

Primary Examiner — Vishal R Sahni
(74) Attorney, Agent, or Firm — Snell & Wilmer, L.L.P.

(57) ABSTRACT

An electrically controlled park and emergency brake system is disclosed. The brake system may comprise a brake control module having a shut-off valve in fluid communication with an outboard servo-valve and an inboard servo-valve. An emergency/park power source may supply fluid to the shut-off valve. The brake system may also comprise a vehicle management system in electronic communication with the brake control module. The brake system may also comprise mechanical inputs, including a wheel well brake handle and a cockpit brake handle. The brake system may also comprise redundant emergency/park power sources.

15 Claims, 6 Drawing Sheets (56) References Cited

U.S. PATENT DOCUMENTS

| | | |
|---|---|---|
| 6,820,946 B2 | 11/2004 | Salamat et al. |
| 9,387,840 B1 * | 7/2016 | Cahill ................... B60T 8/1703 |
| 2004/0239173 A1 * | 12/2004 | Williams .............. B60T 8/1703 |
| | | 303/3 |
| 2012/0085601 A1 * | 4/2012 | Oyama ................... B64C 25/22 |
| | | 188/151 R |
| 2015/0291280 A1 | 10/2015 | Iordanidis et al. |

* cited by examiner

ELECTRICALLY CONTROLLED PARK AND EMERGENCY VALVE ASSEMBLY

CROSS REFERENCE TO RELATED APPLICATIONS

This application is a nonprovisional application of and claims priority to U.S. Provisional Patent Application Ser. No. 62/430,476, filed Dec. 6, 2016, entitled "ELECTRICALLY CONTROLLED PARK AND EMERGENCY VALVE ASSEMBLY," which is incorporated herein by reference in its entirety.

FIELD

The present disclosure relates to aircraft braking, and more specifically, to an electrically controlled park and emergency valve assembly.

BACKGROUND

Aircraft braking systems are typically either manually controlled or used separately in unmanned situations. Aircraft braking systems, emergency braking, and park braking are typically controlled mechanically by cable. For example, a lever may be coupled to a cable which may be coupled to a valve in order to supply hydraulic pressure to a braking system to generate braking force.

SUMMARY

In various embodiments, an aircraft brake system is disclosed. The aircraft brake system may comprise a brake control module having a a shut-off valve (SOV); an outboard servo-valve (OBSV) in fluid communication with the SOV; and an inboard servo-valve (IBSV) in fluid communication with the SOV. The aircraft brake system may comprise an emergency/emergency/park power source in fluid communication with the SOV. The aircraft brake system may comprise a vehicle management system (VMS) in electronic communication with the brake control module. The brake control module may be configured to receive a signal comprising at least one of a VMS signal, a park value, or an emergency value, wherein in response to receiving the signal, at least one of the OBSV or the IBSV may be configured to at least partially open In various embodiments, the aircraft brake system may further comprise a plurality of switches in communication with the brake control module, wherein the plurality of switches comprises at least one of a cockpit enable switch, a wheel well enable switch, a VMS enable switch, a wheel well park switch, a cockpit park switch, or an emergency activate switch. The SOV may be configured to move to an open position in response to at least one of the cockpit enable switch, the wheel well enable switch, or the VMS enable switch being switched on. In various embodiments, the IBSV and the OBSV may be configured to meter the flow of a fluid supplied by the SOV according to at least one of the park value, the emergency value, or the VMS signal. In various embodiments, the OBSV may be in fluid communication with at least one of a right outboard shuttle valve (ROBSV) or a left outboard shuttle valve (LOBSV), and wherein the IBSV may be in fluid communication with at least one of a right inboard shuttle valve (RIBSV) or a left inboard shuttle valve (LIBSV). An outboard braking system may be in fluid communication with at least one of the ROBSV or the LOBSV and an inboard braking system may be in fluid communication with at least one of the RIBSV or the LIBSV. The ROBSV, the LOBSV, the RIBSV, and the LIBSV may be configured to meter the flow of a plurality of fluids according to the pressure of the plurality of fluids. S cockpit brake handle may be in operable communication with a control valve, wherein the control valve is in fluid communication with at least one of the ROBSV, the LOBSV, the RIBSV, or the LIBSV, and wherein the control valve is configured to release a second fluid in response to the cockpit brake handle being activated. A wheel well brake handle in operable communication with the control valve, wherein the control valve is configured to release the second fluid in response to the wheel well brake handle being activated.

In various embodiments, a redundant emergency/park power source brake system is disclosed. The brake system may comprise a first brake control module, comprising: a first shut-off valve (SOV); and an outboard servo-valve (OBSV) in fluid communication with the first SOV. The brake system may comprise a second brake control module, comprising: a second SOV; and an inboard servo-valve (IBSV) in fluid communication with the second SOV. The brake system may comprise a first emergency/park power source in fluid communication with the first SOV. The brake system may comprise a second emergency/park power source in fluid communication with the second SOV. The brake system may comprise a vehicle management system (VMS) in electronic communication with the first brake control module and the second brake control module. The first brake control module may be configured to receive a first signal comprising at least one of a VMS signal, a park value, or an emergency value, wherein in response to receiving the signal, the OBSV may be configured to at least partially open. The second brake control module may be configured to receive a second signal comprising at least one of the VMS signal, the park value, or the emergency value, wherein in response to receiving the signal, the IBSV may be configured to at least partially open.

In various embodiments, the redundant emergency/park power source brake system may further comprise a plurality of switches in communication with the first brake control module and the second brake control module, wherein the plurality of switches comprises at least one of a cockpit enable switch, a wheel well enable switch, a VMS enable switch, a wheel well park switch, a cockpit park switch, or an emergency activate switch. In various embodiments, the OBSV may be configured to meter a flow of a first fluid supplied by the first SOV and the IBSV may be configured to meter a flow of a second fluid supplied by the second SOV, according to at least one of the park value, the emergency value, or the VMS signal. In various embodiments, the OBSV may be in fluid communication with at least one of a right outboard shuttle valve (ROBSV) or a left outboard shuttle valve (LOBSV), and the IBSV may be in fluid communication with at least one of a right inboard shuttle valve (RIBSV) or a left inboard shuttle valve (LIBSV). In various embodiments, the redundant emergency/park power source brake system may further comprise an outboard braking system in fluid communication with at least one of the ROBSV or the LOBSV and an inboard braking system in fluid communication with at least one of the RIBSV or the LIBSV. In various embodiments, the redundant emergency/park power source brake system may further comprise a cockpit brake handle in operable communication with a control valve, wherein the control valve is in fluid communication with at least one of the ROBSV, the LOBSV, the RIBSV, or the LIBSV, and wherein the control valve is configured at least partially open in response to the cockpit brake handle being activated. In various embodiments, the redundant emergency/park power source brake system may further comprise a wheel well brake handle in operable communication with the control valve, wherein the control valve is configured at least partially open in response to the wheel well brake handle being activated.

In various embodiments, a brake system is disclosed. The brake system may comprise a brake control module comprising: a shut-off valve (SOV); an outboard servo-valve (OBSV) in fluid communication with the SOV and an outboard brake system; and an inboard servo-valve (IBSV) in fluid communication with the SOV and an inboard brake system. The brake system may comprise an emergency/park power source in fluid communication with the SOV. The brake system may comprise a plurality of switches in electronic communication with the brake control module, the plurality of switches comprising at least one of a cockpit enable switch, a wheel well enable switch, a VMS enable switch, a wheel well park switch, a cockpit park switch, or an emergency activate switch. The brake system may comprise a cockpit brake handle in operable communication with a first control valve, wherein the first control valve is configured to release a first pressurized fluid to at least one of the outboard brake system or the inboard brake system in response to the cockpit brake handle being activated. The brake system may comprise a wheel well brake handle in operable communication with a second control valve, wherein the second control valve is configured to release the first pressurized fluid to at least one of the outboard brake system or the inboard brake system in response to the wheel well brake handle being activated.

In various embodiments, the SOV may be configured to move to an open position in response to at least one of the cockpit enable switch, the wheel well enable switch, or the VMS enable switch being switched on. In various embodiments, the IBSV and the OBSV may be configured to meter the flow of a fluid supplied by the SOV according to at least one of a park value, an emergency value, or a VMS signal received by the brake control module. In various embodiments, the OBSV may be in fluid communication with the outboard brake system via at least one of a right outboard shuttle valve (ROBSV) or a left outboard shuttle valve (LOBSV), and the IBSV may be in fluid communication with the inboard brake system via at least one of a right inboard shuttle valve (RIBSV) or a left inboard shuttle valve (LIBSV).

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Aircraft wheel and brake assemblies may include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller (or controller) is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

Figure 1:
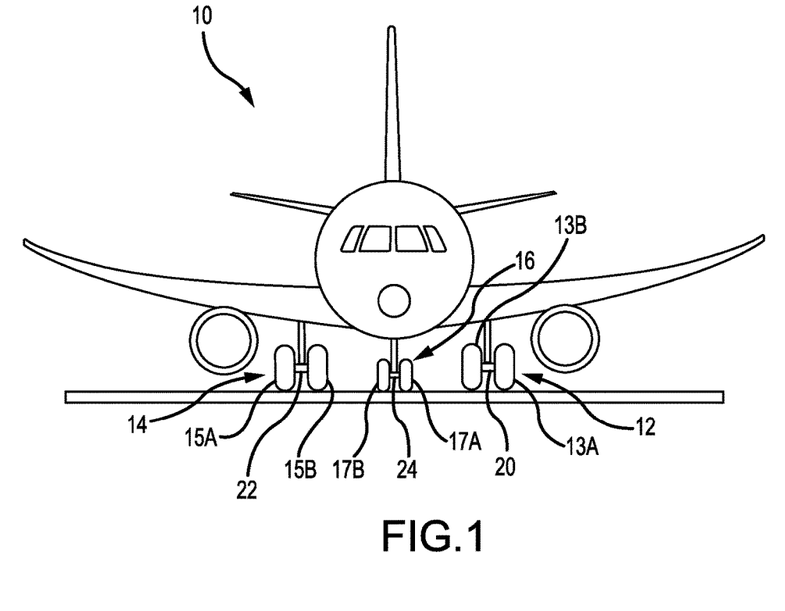
FIG. 1 illustrates an exemplary aircraft with landing gear deployed, in accordance with various embodiments.

In various embodiments, and with reference to FIG. 1, an exemplary aircraft 10 is depicted. Aircraft 10 may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by a strut 20; landing gear 14 may include wheel 15A and wheel 15B coupled by a strut 22; and landing gear 16 may include nose wheel 17A and nose wheel 17B coupled by a strut 24. Wheel 13A and wheel 15A may be referred to as outboard wheels. Wheel 13B and wheel 15B may be referred to as inboard wheels. The nose wheels differ from the main wheels in that the nose wheels may not include a brake. In various embodiments, aircraft 10 may comprise any number of landing gears and each landing gear may comprise any number of wheels.

Aircraft 10 may also include a primary brake system, which may be applied to any wheel of any landing gear. The primary brake system of aircraft 10 may comprise a collection of subsystems that produce output signals for controlling the braking force and/or torque applied at each wheel (e.g., wheel 13A, wheel 13B, wheel 15A, wheel 15B, wheel 17A, and/or wheel 17B). The primary brake system may communicate with the brakes of each landing gear (e.g., landing gear 12, landing gear 14, and/or landing gear 16), and each brake may be mounted to each wheel to apply and release braking force on one or more wheels (e.g., as described herein).

In various embodiments, and with reference to FIGS. 1 and 2, aircraft 10 may comprise an emergency and park brake system (hereinafter "system 200"). System 200 may enable electrically controlled emergency braking and park braking of aircraft 10, such as in response to a failure in the primary brake system. In that respect, system 200 may also enable emergency braking and park braking from multiple locations in aircraft 10 and/or external from aircraft 10 (as discussed further herein). In various embodiments, system 200 may comprise a distinct control system from the primary brake system of aircraft 10, such as, for example, to maintain dissimilarity, independence, separation, and/or redundancy, as desired. System 200 may also be incorporated into the primary brake system of aircraft 10.

In various embodiments, system 200 may include a module 210. Module 210 may comprise a brake control module (BCM). Module 210 may be in communication with shut off valve (SOV) 212. SOV 212 may be supplied with pressurized hydraulic fluid via Park/Emergency Hydraulic Power A 202. Park/Emergency Hydraulic Power A 202 may supply pressurized hydraulic fluid to SOV 212. In various embodiments, Park/Emergency Hydraulic Power A 202 may supply brake fluid to SOV 212. In various embodiments, Park/Emergency Hydraulic Power A 202 may comprise a pressurized fluid system for use during parking and emergency braking. SOV 212 may be coupled to and/or in fluid communication with outboard servo-valve (OBSV) 214 and/or inboard servo-valve (IBSV) 216, via a fluid conduit 215. SOV 212 may be configured to supply OBSV 214 and/or IBSV 216 with pressurized hydraulic fluid in response to being in an open position. OBSV 214 and IBSV 216 may be configured to meter hydraulic fluid pressure between SOV 212 and various other brake system components via an OB fluid conduit 224 and an IB fluid conduit 226, as described further herein.

In various embodiments, the valves as discussed herein may be replaced with various types of valves known to a person having ordinary skill in the art. For example, and in various embodiments, OBSV 214 may be replaced with a shut off valve and/or the like. IBSV 216 may be replaced with a shut off valve and/or the like. In various embodiments, OBSV 214 may be referred to generally as an outboard valve (OBV). In various embodiments, IBSV 216 may be referred to generally an inboard valve (IBV).

In various embodiments, system 200 may receive a first power signal 282. First power signal 282 may be a direct current (DC) power signal. First power signal 282 may comprise a magnitude of approximately twenty-eight volts (28 V). In various embodiments, system 200 may also receive a second power signal 284. Second power signal 284 may be similar to first power signal 282. In various embodiments, system 200 may also receive a vehicle management system (VMS) signal 286. In various embodiments, VMS signal 286 may comprise a computer controlled avionics signal. VMS signal 286 may be controlled by a vehicle management system or a computer controlled avionics system. A vehicle management system may be a system whereby a vehicle may be operated (e.g., take flight) and controlled remotely, without a human aboard the vehicle to operate the vehicle. For example, an aircraft may be controlled by an operator remotely without an operator being aboard the aircraft during operation. In various embodiments, a VMS may comprise a plurality of processors in order to separate the control of various components. For example, a VMS may include vehicle management system A (VMS-A) and vehicle management system B (VMS-B) each controlled by a separate processor of a VMS. VMS-A may be referred to as a first VMS and VMS-B may be referred to as a second VMS. In this regard, flight control signals may be redundant such that the risk of loss of control of the aircraft is mitigated.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, first power signal 282 may be in electronic communication with cockpit enable switch 230 and wheel well enable switch 232. Cockpit enable switch 230 may be located in the cockpit of an aircraft, for example. In various embodiments, a pilot or operator of an aircraft may have access to cockpit enable switch 230. In various embodiments, wheel well enable switch 232 may be located in the wheel well of an aircraft, for example, in a nose landing gear wheel well. In various embodiments, ground crew or other personnel may be able to access wheel well enable switch 232 from the ground by reaching into the wheel well of the aircraft. Cockpit enable switch 230 may be in electronic communication with a first OR gate 236-1. A diode 235-1 may be located between cockpit enable switch 230 and first OR gate 236-1. Wheel well enable switch 232 may be in electronic communication with first OR gate 236-1. A diode 235-2 may be located between wheel well enable switch 232 and first OR gate 236-1.

In various embodiments, second power signal 284 may be in electronic communication with vehicle management system B (VMS-B) enable switch 234. VMS-B enable switch 234 may be commanded by VMS-B signal 286. VMS-B enable switch 234 may be in electronic communication with first OR gate 236-1. A diode 235-3 may be located between VMS-B enable switch 234 and first OR gate 236-1.

In various embodiments, first OR gate 236-1 may be configured to transmit first power signal 282 and/or second power signal 284 to module 210. Module 210 may be configured to open SOV 212 in response to receiving first power signal 282 and/or second power signal 284. For example, in response to cockpit enable switch 230 being closed, and wheel well enable switch 232 and VMS-B enable switch 234 being open, the signal from first power signal 282 may be sent to first OR gate 236-1 and thereby transmitted to SOV 212. As a further example, in response to all three of cockpit enable switch 230, wheel well enable switch 232, and VMS-B enable switch 234 being closed, first power signal 282 and second power signal 284 may be sent to first OR gate 236-1, wherein first OR gate 236-1 may be configured to transmit only one of first power signal 282 and second power signal 284 to SOV 212. In that regard, first OR gate 236-1 may be configured to send at least one input of multiple inputs and, for example, may be configured to output the highest input signal, the lowest input signal, and/or the like.

In various embodiments, in response to at least one of first power signal 282 and second power signal 284 being sent to SOV 212, SOV 212 may be configured to open and supply OBSV 214 and IBSV 216 with a pressurized fluid, as previously described.

In various embodiments, system 200 may include a park value 201 and an emergency value 203. In various embodiments, park value 201 and emergency value 203 may be predetermined set values and may be programmable, such as, for example, in a brake controller (e.g., brake controller 699, with brief reference to FIG. 6). In various embodiments, park value 201 may correspond to a desired force that may be applied to a brake system in response to an aircraft being in a parked position. In various embodiments, emergency value 203 may correspond to a desired force that may be applied to a brake system in an emergency situation. Park value 201 and emergency value 203 may comprise an electrical current value that may be measured in milliamps (mA).

In various embodiments, park value 201 may be in electronic communication with a wheel well park switch 240 and a cockpit park switch 242. Wheel well park switch 240 may be located in the wheel well of an aircraft, such as in the nose landing gear wheel well of an aircraft, for example. Cockpit park switch 242 may be located in the cockpit of an aircraft. Wheel well park switch 240 and cockpit park switch 242 may be in electronic communication with a second OR gate 236-2. A diode 235-4 may be located between wheel well park switch 240 and cockpit park switch 242 and second OR gate 236-2. Wheel well park switch 240 and cockpit park switch 242 may also be in electronic communication with a third OR gate 236-3. A diode 235-5 may be located between wheel well park switch 240 and cockpit park switch 242 and third OR gate 236-3. Second OR gate 236-2 may be in electronic communication with OBSV 214. Third OR gate 236-3 may be in electronic communication with IBSV 216.

In various embodiments, emergency value 203 may be in electronic communication with an emergency activate switch 244. Emergency activate switch 244 may be in electronic communication with second OR gate 236-2. A diode 235-6 may be located between emergency activate switch 244 and second OR gate 236-2. In various embodiments, emergency value 203 may be in electronic communication with an emergency activate switch 245. Emergency activate switch 245 may be in electronic communication with third OR gate 236-3. A diode 235-7 may be located between emergency activate switch 245 and third OR gate 236-3. Emergency activate switch 244 and emergency activate switch 245 may be located in the cockpit of an aircraft. In various embodiments, various switches may be located geographically close to one another. For example, wheel well enable switch 232 may be located in close proximity to wheel well park switch 240.

In various embodiments, vehicle management system (VMS) 286 may be in electronic communication with second OR gate 236-2 via vehicle management system A (VMS-A) signal 285. A diode 235-8 may be located between VMS-A signal 285 and second OR gate 236-2. In various embodiments, VMS 286 may be in electronic communication with third OR gate 236-3 via VMS-A signal 287. A diode 235-9 may be located between VMS-A signal 287 and third OR gate 236-3. VMS-A signal 285 and VMS-A signal 287 may be configured to send a value corresponding to an emergency braking operation. VMS-A signal 285 and VMS-A signal 287 may also be configured to send a value corresponding to a park braking operation. In various embodiments, the value corresponding to a park braking operation may be larger in magnitude than the value corresponding to an emergency braking operation.

In various embodiments, second OR gate 236-2 may be a priority OR gate. For example, second OR gate 236-2 may be configured to transmit the signal with the highest value. For example, in response to second OR gate 236-2 receiving a signal of eighteen milliamps (18 mA) from emergency value 203 and a signal of 30 milliamps (30 mA) from VMS-A signal 285, second OR gate 236-2 may be configured to transmit the signal of 30 mA to OBSV 214. Third OR gate 236-3 may be similar to second OR gate 236-2.

In various embodiments, OBSV 214 may be configured to meter fluid pressure between SOV 212 and a first outboard shuttle valve 251-1 and/or a second outboard shuttle valve 251-2. IBSV 216 may be configured to meter fluid pressure between SOV 212 and a first inboard shuttle valve 252-1 and/or a second inboard shuttle valve 252-2. OBSV 214 may be coupled to and/or in fluid communication with first outboard shuttle valve 251-1 and/or second outboard shuttle valve 251-2 via OB fluid conduit 224. IBSV 216 may be coupled to and/or in fluid communication with first inboard shuttle valve 252-1 and/or second inboard shuttle valve 252-2 via IB fluid conduit 226.

In various embodiments, inboard shuttle valves 252 and outboard shuttle valves 251 may receive pressurized fluid from various components. For example, first outboard shuttle valve 251-1 may receive pressurized fluid from a Primary Hydraulic Left OB Power A 204-1. Second outboard shuttle valve 251-2 may receive pressurized fluid from a Primary Hydraulic Right OB Power A 204-2. Each outboard shuttle valve 251 may also receive pressurized fluid from OBSV 214, via OB fluid conduit 224. For example, first inboard shuttle valve 252-1 may receive pressurized fluid from a Primary Hydraulic Left IB Power B 206-1. Second inboard shuttle valve 252-2 may receive pressurized fluid from a Primary Hydraulic Right IB Power B 206-2. Each inboard shuttle valve 252 may also receive pressurized fluid from IBSV 216, via IB fluid conduit 226. Primary Hydraulic Power A 204 and Primary Hydraulic Power B 206 may comprise a braking system during normal operation such as deflection of a brake pedal in order to slow down an aircraft.

In various embodiments, outboard shuttle valves 251 and inboard shuttle valves 252 may be priority shuttle valves such that in response to receiving multiple inputs, the output comprises the highest pressure input. For example, in response to OBSV 214 supplying outboard shuttle valves 251 with pressurized fluid at a pressure of 3,000 psi (20,684 kPa) and Primary Hydraulic Power A 204 supplying outboard shuttle valves 251 with pressurized fluid at a pressure of 1,500 psi (10,342 kPa), outboard shuttle valves 251 may be configured to supply outboard brakes 272A, 274A with pressurized fluid at a pressure of 3,000 psi (20,684 kPa).

In various embodiments, first outboard shuttle valve 251-1 may be coupled to and/or in fluid communication with an outboard brake 272A and second outboard shuttle valve 251-2 may be coupled to and/or in fluid communication with an outboard brake 274A. First inboard shuttle valve 252-1 may be coupled to and/or in fluid communication with an inboard brake 274B and second inboard shuttle valve 252-2 may be coupled to and/or in fluid communication with an inboard brake 272B. Hydraulic fuses 262-1, 262-2 may be located between outboard shuttle valves 251-1, 251-2 and outboard brakes 272A, 274A. Hydraulic fuses 262-3, 262-4 may be located between inboard shuttle valves 252-1, 252-2 and inboard brakes 274B, 272B. Hydraulic fuses 262 may be a component configured to prevent sudden loss of hydraulic fluid pressure. Inboard brakes 272B and inboard brakes 274B may be coupled to wheel 13B and wheel 15B, respectively. Outboard brakes 272A and outboard brakes 274A may be coupled to wheel 15A and wheel 13A, respectively. Outboard brakes 272A, 274A may be configured to be operated hydraulically in order to decrease the angular velocity of a wheel.

In various embodiments, a vehicle operator may close cockpit enable switch 230, which may open SOV 212. In response to being in the open position, SOV 212 may supply six thousand pounds per square inch (6,000 psi or 41,368 kPa) of pressurized fluid to OBSV 214 and IBSV 216. Park value 201 may comprise a signal corresponding to three thousand pounds per square inch (3,000 psi or 20,684 kPa) of pressure. If it is desired that 3,000 psi (20,684 kPa) of pressure be applied to the brakes of an aircraft, an operator may close cockpit park switch 242 which may send park value 201 to OBSV 214 and IBSV 216. OBSV 214 and IBSV 216 may be configured to input the 6,000 psi (41,368 kPa) pressurized fluid and output 3,000 psi (20,684 kPa) of pressurized fluid in a manner which is known to a person having ordinary skill in the art. The output of 3,000 psi (20,684 kPa) of pressurized fluid from OBSV 214 and IBSV 216 may be supplied to outboard shuttle valves 251, via OB fluid conduit 224, and inboard shuttle valves 252, via IB fluid conduit 226, and ultimately to inboard brakes 272B, 274B and outboard brakes 272A, 274A. In the described example, Primary Hydraulic Power A 204-1, 204-2 and Primary Hydraulic Power B 206-1, 206-2 are all supplying less than 3,000 psi (20,684 kPa) of pressurized fluid to outboard shuttle valves 251 and inboard shuttle valves 252, respectively. In this manner, system 200 may require two separate commands by two separate intelligent systems in order to enable vehicle braking, namely an enable command which supplies pressurized fluid to OBSV 214 and IBSV 216 and an activate command which opens at least one of OBSV 214 and IBSV 216.

Figure 2:
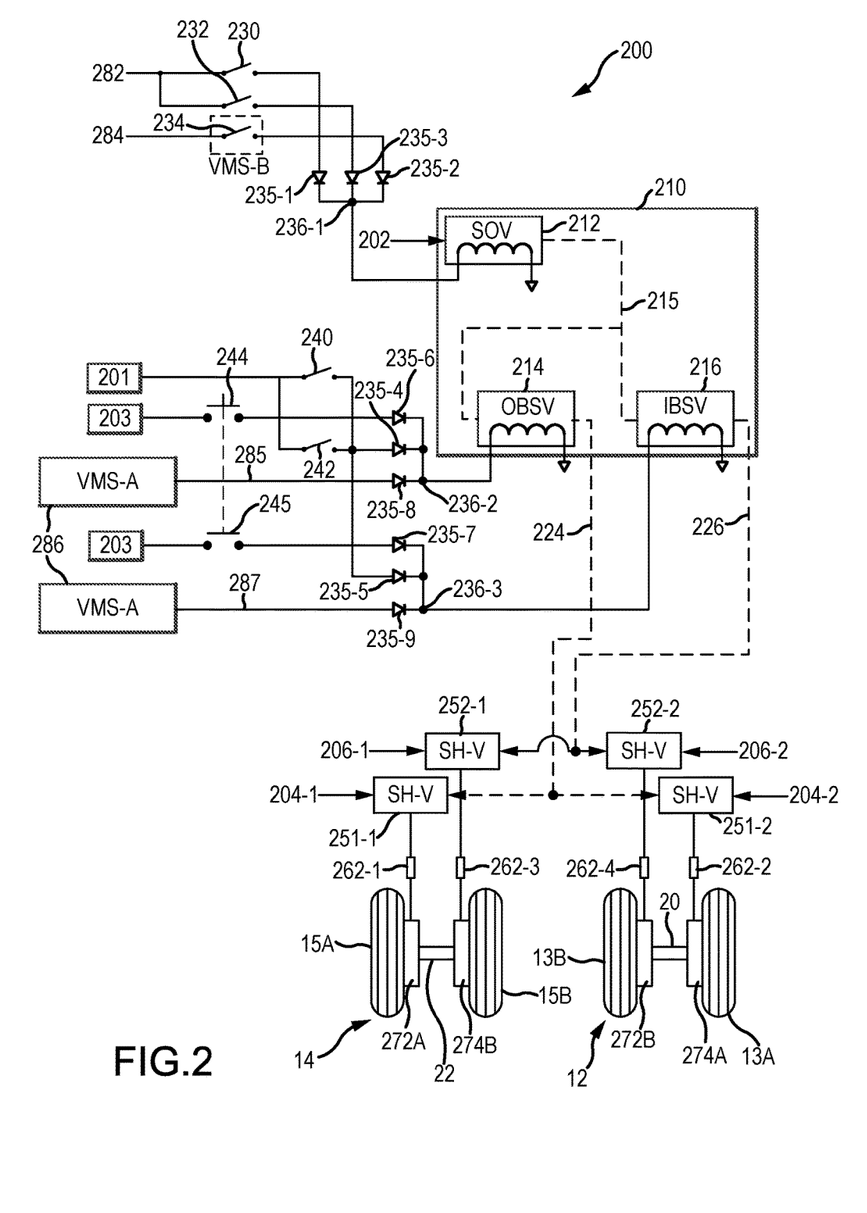
FIG. 2 illustrates a schematic view of an electrically controlled park and emergency brake system, in accordance with various embodiments.
Figure 3:
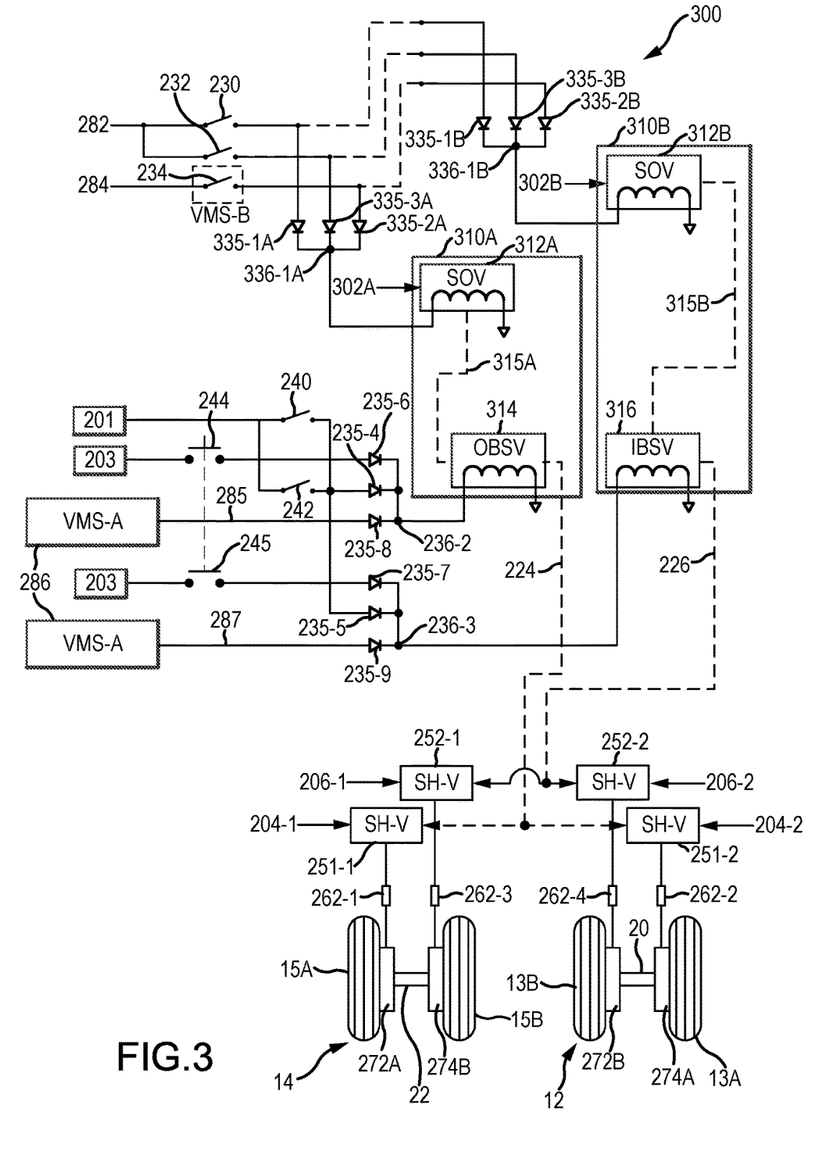
FIG. 3 illustrates a schematic view of an electrically controlled park and emergency brake system with emergency/parking power source redundancy, in accordance with various embodiments.

In various embodiments, and with reference to FIG. 3, elements with like element numbering as depicted in FIG. 2 are intended to be the same and will not necessarily be repeated for the sake of clarity.

In various embodiments, FIG. 3 illustrates an emergency and park brake system (hereinafter "system 300") with emergency/parking power source redundancy. System 300 may comprise a first OR gate 336-1A. First OR gate 336-1A may be similar to first OR gate 236-1 of FIG. 2. First OR gate 336-1A may be in electronic communication with SOV 312A. System 300 may comprise a fourth OR gate 336-1B. Fourth OR gate 336-1B may be similar to first OR gate 236-1 of FIG. 2. Fourth OR gate 336-1B may be in electronic communication with SOV 312B. System 300 may also comprise a plurality of diodes 335-1A, 335-2A, 335-3A, 335-1B, 335-2B, and/or 335-3B. Diodes 335-1A, 335-2A, 335-3A, 335-1B, 335-2B, and/or 335-3B may be similar to diodes 235-1, 235-2, and/or 235-3 of FIG. 2.

In various embodiments, system 300 may comprise a plurality of modules. For example, system 300 may comprise a module 310A and a module 310B. Module 310A may be referred to as a first module. Module 310B may be referred to as a second module. Module 310A may comprise SOV 312A. SOV 312A may be similar to SOV 312 of FIG. 2. SOV 312A may be coupled to and/or in fluid communication with OBSV 314, via fluid conduit 315A. OBSV 314 may be similar to OBSV 214 of FIG. 2. Module 310B may comprise SOV 312B. SOV 312B may be similar to SOV 212 of FIG. 2. SOV 312B may be coupled to and/or in fluid communication with IBSV 316, via fluid conduit 315B. IBSV 316 may be similar to IBSV 216 of FIG. 2.

In various embodiments, system 300 may comprise a Park/Emergency Hydraulic Power A 302A. Park/Emergency Hydraulic Power A 302A may be similar to Park/Emergency Hydraulic Power A 202 of FIG. 2. Park/Emergency Hydraulic Power A 302A may be coupled to and/or in fluid communication with SOV 312A. System 300 may also comprise a Park/Emergency Hydraulic Power A 302B. Park/Emergency Hydraulic Power A 302A may be similar to Park/Emergency Hydraulic Power A 202 of FIG. 2. Park/Emergency Hydraulic Power A 302B may be coupled to and/or in fluid communication with SOV 312B. Accordingly, system 300 may comprise hydraulic power source redundancy. Therefore, in the event that one power source fails, the other power source may still be able to supply hydraulic or pneumatic pressure to the brakes of an aircraft.

Figure 4:
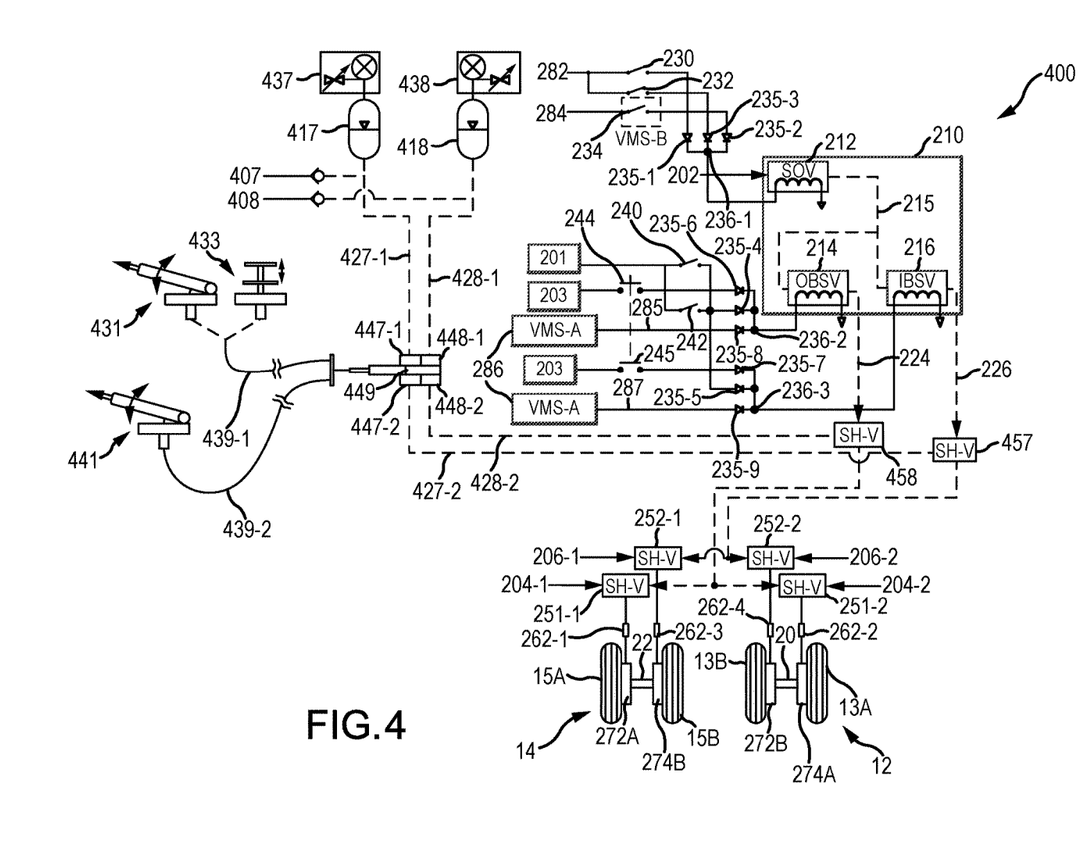
FIG. 4 illustrates a schematic view of an electrically controlled park and emergency brake system with mechanical brake controls, in accordance with various embodiments.

In various embodiments, and with reference to FIG. 4, elements with like element numbering as depicted in FIG. 2 are intended to be the same and will not necessarily be repeated for the sake of clarity.

In various embodiments, FIG. 4 illustrates an emergency and park brake system (hereinafter "system 400") with mechanical emergency and park braking inputs. In that regard, system 400 may allow for separate mechanical and electrical emergency and park braking inputs, as described further herein. System 400 may comprise a control valve 449 configured to meter pressurized hydraulic fluid. Control valve 449 may be coupled to and/or in fluid communication with an IB inlet 447-1 and an IB outlet 447-2. IB inlet 447-1 may be in fluid communication with fluid conduit 427-1. IB outlet 447-2 may be in fluid communication with a third IB shuttle valve 457, via a fluid conduit 427-2. Control valve 449 may also be coupled to and/or in fluid communication with an OB inlet 448-1 and an OB outlet 448-2. OB outlet 448-1 may be in fluid communication with fluid conduit 428-1. OB outlet 448-2 may be in fluid communication with a third OB shuttle valve 458 via a fluid conduit 428-2.

In various embodiments, third IB shuttle valve 457 may be similar to inboard shuttle valves 252 of FIG. 2. Third OB shuttle valve 458 may be similar to outboard shuttle valves 251 of FIG. 2. Third IB shuttle valve 457 may be in fluid communication with inboard shuttle valves 252. Third OB shuttle valve 458 may be in fluid communication with outboard shuttle valves 251. In various embodiments, third IB shuttle valve 457 and third OB shuttle valve 458 may be priority shuttle valves such that in response to receiving multiple inputs, the output comprises the highest pressure input. For example, in response to OBSV 214 and IBSV 216 supplying third OB shuttle valve 458 and third IB shuttle valve 457, respectively, with pressurized fluid at a pressure of 1,500 psi (10,342 kPa), and control valve 449 supplying third OB shuttle valve 458 and third IB shuttle valve 457 with 3,000 psi (20,684 kPa) of pressurized fluid, third OB shuttle valve 458 and third IB shuttle valve 457 may be configured to output pressurized fluid at a pressure of 3,000 psi (20,684 kPa) to outboard shuttle valves 251 and inboard shuttle valves 252, respectively.

In various embodiments, Hydraulic Power A 407 may supply pressurized hydraulic fluid to control valve 449, via fluid conduit 427-1 and IB inlet 447-1. Hydraulic Power A 407 may be similar to Park/Emergency Hydraulic Power A 202 of FIG. 2. Hydraulic Power B 408 may supply pressurized hydraulic fluid to control valve 449, via fluid conduit 428-1 and OB inlet 448-1. Hydraulic Power B 408 may be similar to Park/Emergency Hydraulic Power A 202 of FIG. 2.

In various embodiments, system 400 may comprise an IB hydraulic accumulator 417 and/or an OB hydraulic accumulator 418. IB hydraulic accumulator 417 may supply pressurized hydraulic fluid to IB inlet 447-1, via fluid conduit 427-1. OB hydraulic accumulator 418 may supply pressurized hydraulic fluid to OB inlet 448-1, via fluid conduit 428-1. The hydraulic fluid in IB hydraulic accumulator 417 may be pressurized by a nitrogen gas, and/or the like, provided by IB charge valve 437. The hydraulic fluid in OB hydraulic accumulator 418 may be pressurized by a nitrogen gas, and/or the like, provided by OB charge valve 438.

In various embodiments, a pilot or operator of an aircraft may have access to various mechanical emergency and park braking inputs. For example, system 400 may comprise a cockpit handle 431 and/or a cockpit t-handle 433. Cockpit handle 431 and/or cockpit t-handle 433 may be in operative communication with control valve 449 via a cockpit cable 439-1. In that respect, cockpit handle 431 and/or cockpit t-handle 433 may be coupled to cockpit cable 439-1. Cockpit cable 439-1 may comprise a ball bearing cable wherein in response to activation by cockpit handle 431 and/or cockpit t-handle 433 (e.g., pulling the handle), cockpit cable 439-1 may cause control valve 449 to move into an open position. In the open position, control valve 449 may supply pressurized hydraulic fluid to third IB shuttle valve 457 and third OB shuttle valve 458.

In various embodiments, system 400 may also comprise a wheel well handle 441. Wheel well handle 441 may be located in the wheel well of an aircraft, for example, in a nose landing gear wheel well. In various embodiments, ground crew or other personnel may be able to access wheel well handle 441 from the ground by reaching into the wheel well of the aircraft. Wheel well handle 441 may be in operative communication with control valve 449 via a wheel well cable 439-2. In that respect, wheel well handle 441 may be coupled to wheel well cable 439-2. Wheel well cable 439-2 may comprise a ball bearing cable wherein in response to activation by wheel well handle 441 (e.g., pulling the handle), wheel well cable 439-2 may cause control valve 449 to move into an open position. In the open position, control valve 449 may supply pressurized hydraulic fluid to third IB shuttle valve 457 and third OB shuttle valve 458. Accordingly, system 400 may allow for separate mechanical and electrical emergency and park braking inputs. Therefore, in the event that system 400 encounters an electrical system failure, the mechanical emergency and park braking inputs may still supply hydraulic or pneumatic pressure to the brakes of an aircraft.

Figure 5:
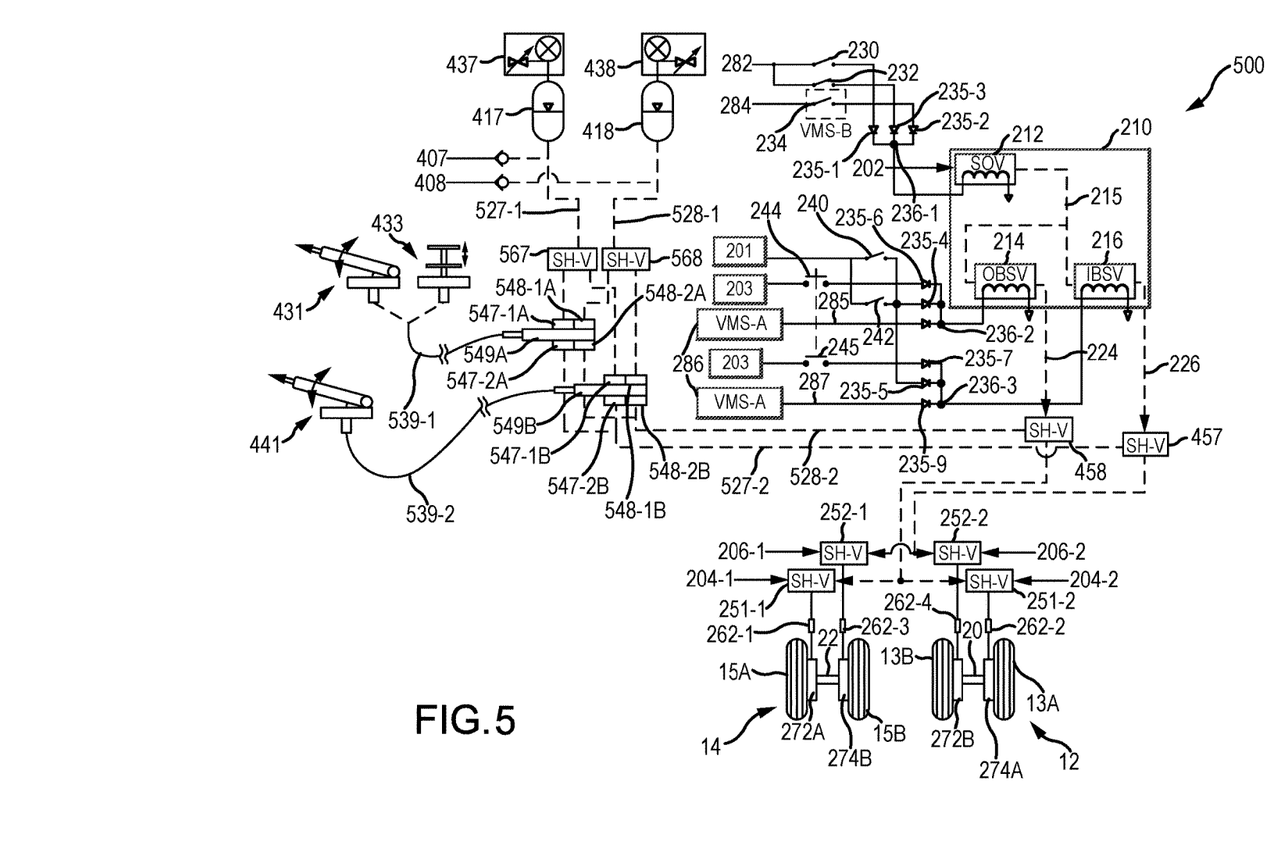
FIG. 5 illustrates a schematic view of an electrically controlled park and emergency brake system with mechanical brake controls having isolated cockpit and wheel well valves, in accordance with various embodiments.

In various embodiments, and with reference to FIG. 5, elements with like element numbering as depicted in FIG. 4 are intended to be the same and will not necessarily be repeated for the sake of clarity.

In various embodiments, FIG. 5 illustrates an emergency and park brake system (hereinafter "system 500") with mechanical emergency and park braking inputs having isolated cockpit and wheel well control valves. In that regard, system 500 may allow for separate mechanical and electrical emergency and park braking inputs with each mechanical input having separate control valves, as described further herein. System 500 may comprise a cockpit control valve 549A and a wheel well control valve 549B. Cockpit control valve 549A may be similar to control valve 449 of FIG. 4. Wheel well control valve 549B may be similar to control valve 449 of FIG. 4.

In various embodiments, cockpit control valve 549A may be coupled to and/or in fluid communication a cockpit IB inlet 547-1A and a cockpit IB outlet 547-2A. Cockpit IB inlet 547-1A may be similar to IB inlet 447-1 of FIG. 4. Cockpit IB outlet 547-2A may be similar to IB outlet 447-2 of FIG. 4. Cockpit control valve 549A may be coupled to and/or in fluid communication a cockpit OB inlet 548-1A and a cockpit OB outlet 548-2A. Cockpit OB inlet 548-1A may be similar to OB inlet 448-1 of FIG. 4. Cockpit OB outlet 548-2A may be similar to OB outlet 448-2 of FIG. 4. In various embodiments, wheel well control valve 549B may be coupled to and/or in fluid communication with a wheel well IB inlet 547-1B and a wheel well IB outlet 547-2B. Wheel well IB inlet 547-1B may be similar to IB inlet 447-1 of FIG. 4. Wheel well IB outlet 547-2B may be similar to IB outlet 447-2 of FIG. 4. Wheel well control valve 549B may be coupled to and/or in fluid communication a wheel well OB inlet 548-1B and a wheel well OB outlet 548-2B. Wheel well OB inlet 548-1B may be similar to OB inlet 448-1 of FIG. 4. Wheel well OB outlet 548-2B may be similar to OB outlet 448-2 of FIG. 4.

In various embodiments, cockpit IB inlet 547-1A and wheel well IB inlet 547-1B may be in fluid communication with a fourth IB shuttle valve 567. Fourth IB shuttle valve 567 may be similar to third IB shuttle valve 457 of FIG. 4. Fourth IB shuttle valve 567 may be configured to receive pressurized hydraulic fluid via fluid conduit 527-1, and transmit the pressurized hydraulic fluid to cockpit IB inlet 547-1A and wheel well IB inlet 547-1B. Cockpit IB outlet 547-2A and wheel well IB outlet 547-2B may be in fluid communication with third IB shuttle valve 457, and may transmit the pressurized hydraulic fluid via fluid conduit 527-2 to third IB shuttle valve 457. In various embodiments, cockpit OB inlet 548-1A and wheel well OB inlet 548-1B may be in fluid communication with a fourth OB shuttle valve 568. Fourth OB shuttle valve 568 may be similar to third OB shuttle valve 458 of FIG. 4. Fourth OB shuttle valve 568 may be configured to receive pressurized hydraulic fluid via fluid conduit 528-1, and transmit the pressurized hydraulic fluid to cockpit OB inlet 548-1A and wheel well OB inlet 548-1B. Cockpit OB outlet 548-2A and wheel well OB outlet 548-2B may be in fluid communication with third OB shuttle valve 458, and may transmit the pressurized hydraulic fluid via fluid conduit 528-2 to third OB shuttle valve 458.

In various embodiments, cockpit handle 431 and/or cockpit t-handle 433 may be in operative communication with cockpit control valve 549A via a cockpit cable 539-1. Cockpit cable 539-1 may be similar to cockpit cable 439-1 of FIG. 4, and in response to activation by cockpit handle 431 and/or cockpit t-handle 433 (e.g., pulling the handle), cockpit cable 539-1 may cause cockpit control valve 549A to move into an open position. In the open position, cockpit control valve 549A may supply pressurized hydraulic fluid to third IB shuttle valve 457 and third OB shuttle valve 458. In various embodiments, wheel well handle 441 may be in operative communication with wheel well control valve 549B via a wheel well cable 539-2. Wheel well cable 539-2 may be similar to wheel well cable 439-2 of FIG. 4, and in response to activation by wheel well handle 441 (e.g., pulling the handle), wheel well cable 539-2 may cause wheel well control valve 549B to move into an open position. In the open position, wheel well control valve 549B may supply pressurized hydraulic fluid to third IB shuttle valve 457 and third OB shuttle valve 458. Accordingly, system 500 may allow for separate mechanical and electrical emergency and park braking inputs, with each mechanical input having separate control valves. Therefore, in the event that system 500 encounters an electrical system failure and/or a failure in either mechanical input, the remaining mechanical emergency and park braking input may still supply hydraulic or pneumatic pressure to the brakes of an aircraft.

Figure 6:
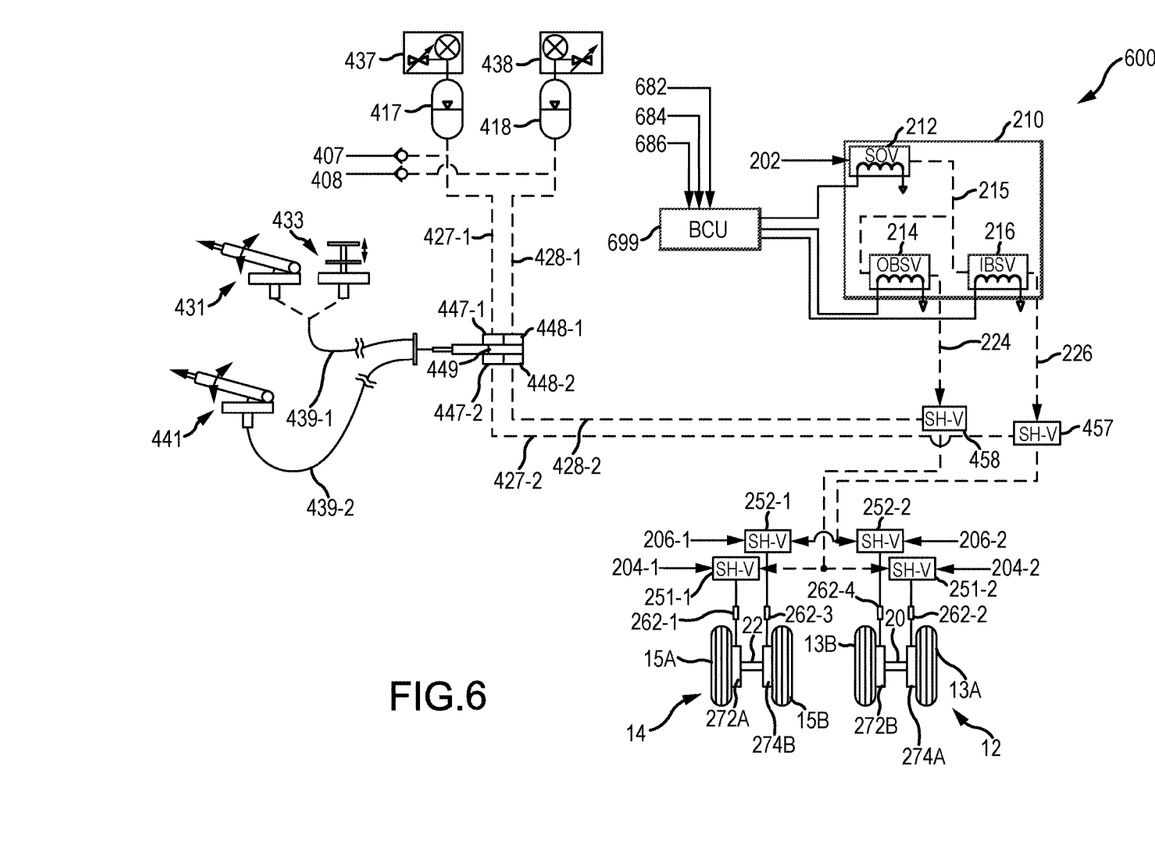
FIG. 6 illustrates a schematic view of an electrically controlled park and emergency brake system comprising a brake controller, in accordance with various embodiments.

In various embodiments, and with reference to FIG. 6, elements with like element numbering as depicted in FIG. 4 are intended to be the same and will not necessarily be repeated for the sake of clarity.

In various embodiments, FIG. 6 illustrates an emergency and park brake system (hereinafter "system 600") comprising a brake controller 699. In various embodiments, brake controller 699 may be a controller and/or processor. In various embodiments, brake controller 699 may be implemented in a single controller and/or processor. In various embodiments, brake controller 699 may be implemented in multiple controllers and/or processors. In various embodiments, brake controller 699 may be implemented in a brake control unit (BCU). In various embodiments, brake controller 699 may also be implemented in a machine-readable non-transitory medium and performed by a controller.

In various embodiments, brake controller 699 may receive a first power signal 682. First power signal 682 may be similar to first power signal 282 of FIG. 4. Brake controller 699 may receive a second power signal 684. Second power signal 684 may be similar to second power signal 284 of FIG. 4. Brake controller 699 may also receive a VMS signal 686. VMS signal 686 may be similar to VMS signal 286 of FIG. 4. In that respect, brake controller 699 may control the flow of pressurized hydraulic fluid in brake module 210 (e.g., SOV 212, OBSV 214, and/or IBSV 216). For example, brake controller 699 may include park values and emergency values (e.g., similar to park value 201 and emergency value 203, with reference to FIG. 2) comprising set values and programmable in brake controller 699. The park values may correspond to a desired force that may be applied to a brake system in response to an aircraft being in a parked position. The emergency values may correspond to a desired force that may be applied to a brake system in an emergency situation. For example, the park values and emergency values may comprise an electrical current value that may be measured in milliamps (mA). In response to receiving a request to provide braking force (e.g., emergency braking or park braking), brake controller 699 may control the flow of pressurized hydraulic fluid in brake module 210, as previously described.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft brake system, comprising:
    a brake control module comprising:
        a shut-off valve (SOV) to release a first fluid in response to at least one of a first power signal or a second power signal;
        an outboard servo-valve (OBSV) in fluid communication with the SOV via a first fluid conduit in response to the SOV being in an open position and in fluid communication via a first outboard (OB) fluid conduit with at least one of a right outboard shuttle valve (ROBSV) or a left outboard shuttle valve (LOBSV); and
        an inboard servo-valve (IBSV) in fluid communication with the SOV via the first fluid conduit in response to the SOV being in an open position and in fluid communication via a first inboard (IB) fluid conduit with and at least one of a right inboard shuttle valve (RIBSV) or a left inboard shuttle valve (LIBSV);
    an emergency/park power source in fluid communication with the SOV;
    a vehicle management system (VMS) in electronic communication with the brake control module,
    wherein the brake control module is configured to receive a signal comprising at least one of a VMS signal, a park value, or an emergency value, wherein in response to receiving the signal, at least one of the OBSV or the IBSV may be configured to at least partially open;
    a cockpit brake handle in mechanical communication with a control valve, wherein the control valve is in fluid communication with at least one of the ROBSV or the LOBSV via a second outboard (OB) fluid conduit in response to the control valve being in an open position, wherein the control valve is in fluid communication with at least one of the RIBSV or the LIBSV via a second inboard (IB) fluid conduit, and wherein the control valve is configured to release a second fluid into the second OB fluid conduit and the second IB fluid conduit in response to the cockpit brake handle being activated; and
    a wheel well brake handle in mechanical communication with the control valve, wherein the control valve is configured to release the second fluid into the second OB fluid conduit and the second IB fluid conduit in response to the wheel well brake handle being activated.

2. The aircraft brake system of claim 1, further comprising a plurality of switches in communication with the brake control module, wherein the plurality of switches comprises at least one of a cockpit enable switch, a wheel well enable switch, a VMS enable switch, a wheel well park switch, a cockpit park switch, or an emergency activate switch.

3. The aircraft brake system of claim 2, wherein the SOV is configured to receive the at least one of the first power signal or the second power signal in response to at least one of the cockpit enable switch, the wheel well enable switch, or the VMS enable switch being switched on.

4. The aircraft brake system of claim 1, wherein the IBSV and the OBSV are configured to meter a flow of the fluid supplied by the SOV according to at least one of the park value, the emergency value, or the VMS signal.

5. The aircraft brake system of claim 1, further comprising an outboard braking system in fluid communication with at least one of the ROBSV or the LOBSV and an inboard braking system in fluid communication with at least one of the RIBSV or the LIBSV.

6. The aircraft brake system of claim 5, wherein the ROBSV, the LOBSV, the RIBSV, and the LIBSV are configured to meter a flow of a plurality of fluids according to a pressure of the plurality of fluids.

7. The aircraft brake system of claim 1, further comprising:
    a third inboard (IB) shuttle valve in fluid communication with the IBSV via the first IB fluid conduit in response to the IBSV being in an open position, and the third IB shuttle valve being in fluid communication via with the control valve via the second IB fluid conduit in response to the control valve being in an open position, wherein the third IB shuttle valve is configured to output either a first IB input pressure from the first IB fluid conduit or a second IB pressure from the second IB fluid conduit in response to both the IBSV and the control valve being in an open position; and
    a third outboard (OB) shuttle valve in fluid communication with the OBSV via the first OB fluid conduit in response to the OBSV being in an open position, and the third OB shuttle valve being in fluid communication via the control valve via the second OB fluid conduit in response to the control valve being in an open position, wherein the third OB shuttle valve are configured to output either a first OB input pressure from the first OB fluid conduit or a second OB pressure from the second OB fluid conduit in response to both the OBSV and the control valve being in an open position.

8. A redundant emergency/park power source brake system, comprising:
    a first brake control module, comprising:

a first shut-off valve (SOV) configured to release a first fluid in response to at least one of a first power signal or a second power signal; and an outboard servo-valve (OBSV) in fluid communication with the first SOV via a first fluid conduit in response to the first SOV being in an open position and in fluid communication via a first outboard (OB) fluid conduit with at least one of a right outboard shuttle valve (ROBSV) or a left outboard shuttle valve (LOBSV);

a second brake control module, comprising:

a second SOV configured release a second fluid in response to at least one of the first power signal or the second power signal; and an inboard servo-valve (IBSV) in fluid communication with the second SOV via a second fluid conduit in response to the second SOV being in an open position and in fluid communication via a first inboard (IB) fluid conduit with and at least one of a right inboard shuttle valve (RIBSV) or a left inboard shuttle valve (LIBSV);

a first emergency/park power source in fluid communication with the first SOV;

a second emergency/park power source in fluid communication with the second SOV; and a vehicle management system (VMS) in electronic communication with the first brake control module and the second brake control module, wherein the first brake control module is configured to receive a first signal comprising at least one of a VMS signal, a park value, or an emergency value, wherein in response to receiving the signal, the OBSV is configured to at least partially open, wherein the second brake control module is configured to receive a second signal comprising at least one of the VMS signal, the park value, or the emergency value, wherein in response to receiving the signal, the IBSV is configured to at least partially open; and a cockpit brake handle in mechanical communication with a control valve, wherein the control valve is in fluid communication with at least one of the ROBSV or the LOBSV via a second outboard (OB) fluid conduit in response to the control valve being in an open position, wherein the control valve is in fluid communication with at least one of the RIBSV or the LIBSV via a second inboard (IB) fluid conduit, and wherein the control valve is configured to release a third fluid into the second OB fluid conduit and the second IB fluid conduit in response to the cockpit brake handle being activated; and a wheel well brake handle in mechanical communication with the control valve, wherein the control valve is configured to release the second fluid into the second OB fluid conduit and the second IB fluid conduit in response to the wheel well brake handle being activated.

9. The redundant emergency/park power source brake system of claim 8, further comprising a plurality of switches in communication with the first brake control module and the second brake control module, wherein the plurality of switches comprises at least one of a cockpit enable switch, a wheel well enable switch, a VMS enable switch, a wheel well park switch, a cockpit park switch, or an emergency activate switch.

10. The redundant emergency/park power source brake system of claim 8, wherein the OBSV is configured to meter a first flow of the first fluid supplied by the first SOV and the IBSV is configured to meter a second flow of the second fluid supplied by the second SOV, according to at least one of the park value, the emergency value, or the VMS signal.

11. The redundant emergency/park power source brake system of claim 8, further comprising an outboard braking system in fluid communication with at least one of the ROBSV or the LOBSV and an inboard braking system in fluid communication with at least one of the RIBSV or the LIBSV.

12. A brake system, comprising:
a brake control module comprising:
a shut-off valve (SOV) to release a first fluid in response to at least one of a first power signal or a second power signal;
an outboard servo-valve (OBSV) in fluid communication with the SOV via a first fluid conduit in response to the SOV being in an open position and in fluid communication via a first outboard (OB) fluid conduit with an outboard brake system; and
an inboard servo-valve (IBSV) in fluid communication with the SOV via the first fluid conduit in response to the SOV being in an open position and in fluid communication via a first inboard (IB) fluid conduit with an inboard brake system;
an emergency/park power source in fluid communication with the SOV;
a plurality of switches in electronic communication with the brake control module, the plurality of switches comprising at least one of a cockpit enable switch, a wheel well enable switch, a VMS enable switch, a wheel well park switch, a cockpit park switch, or an emergency activate switch;
a cockpit brake handle in mechanical communication with a first control valve, wherein the first control valve is configured to release a first pressurized fluid to at least one of the outboard brake system via a second outboard (OB) fluid conduit or the inboard brake system via a second inboard (TB) fluid conduit in response to the cockpit brake handle being activated; and
a wheel well brake handle in mechanical communication with a second control valve, wherein the second control valve is configured to release the first pressurized fluid to at least one of the outboard brake system or the inboard brake system in response to the wheel well brake handle being activated.

13. The brake system of claim 12, wherein the SOV is configured to move to an open position in response to at least one of the cockpit enable switch, the wheel well enable switch, or the VMS enable switch being switched on.

14. The brake system of claim 12, wherein the IBSV and the OBSV are configured to meter a flow of a fluid supplied by the SOV according to at least one of a park value, an emergency value, or a VMS signal received by the brake control module.

15. The brake system of claim 12, wherein the OBSV is in fluid communication with the outboard brake system via at least one of a right outboard shuttle valve (ROBSV) or a left outboard shuttle valve (LOBSV), and wherein the IBSV is in fluid communication with the inboard brake system via at least one of a right inboard shuttle valve (RIBSV) or a left inboard shuttle valve (LIBSV).

* * * * *